United States Patent [19]

Holloway

[11] 4,349,657
[45] Sep. 14, 1982

[54] POLYURETHANE PROCESS

[75] Inventor: John A. Holloway, Sheffield Lake, Ohio

[73] Assignee: The B. F. Goodrich Company, Akron, Ohio

[21] Appl. No.: 306,065

[22] Filed: Sep. 28, 1981

[51] Int. Cl.$^3$ .............................................. C08G 18/42
[52] U.S. Cl. ...................................................... 528/66
[58] Field of Search ......................................... 528/66

[56] References Cited

U.S. PATENT DOCUMENTS 4,248,432  2/1981  Hewitt et al. ........................ 528/83

Primary Examiner—Maurice J. Welsh
Attorney, Agent, or Firm—J. Hughes Powell, Jr.

[57] ABSTRACT

An improved method for preparing polyesterurethanes with p-phenylene diisocyanate is realized by (1) first reacting a polyester with a molar excess of p-phenylene diisocyanate to provide an isocyanate-terminated polyesterurethane, which is then (2) further reacted with additional amounts of polyester used to make the polyesterurethane. The first stage polymer (1) as prepared, is liquid and stable at temperatures of reaction with additional polyester, so that a continuous commercial process is possible without the stability problems faced when reacting all of the polyester and p-phenylene diisocyanate together to form the desired polyesterurethane.

8 Claims, No Drawings

POLYURETHANE PROCESS

BACKGROUND OF THE INVENTION

While polyesterurethanes prepared by the reaction of a hydroxyl terminated ester and p-phenylene diisocyanate are known, these materials are not of substantial commercial importance. One of the problems in making such materials, particularly on a continuous basis, is the instability of p-phenylene diisocyanate in the molten state that is required for continuous operations. The melting point of p-phenylene diisocyanate is about 95° C. compared to the melting point of about 37° C. for diphenylmethane-p,p'-diisocyanate, for example, that is often used in commercial preparation of polyesterurethanes. At 95° C., the rate of degradation of the p-phenylene diisocyanate is excessive and the degradation is evidenced by the formation of dimers, trimers, and higher oligomers at the rate of about 0.33% per hour. These degradation products do not melt below about 200° C. so once they are formed in storage tanks or metering system lines, they tend to plug the equipment and are difficult to remove. Stabilizers for the degradation of p-phenylene diisocyanate at elevated temperatures are not known. An improved method for the preparation of polyesterurethanes with p-phenylene diisocyanate that avoids these problems is desired.

SUMMARY OF THE INVENTION

An improved method for preparing polyesterurethanes with p-phenylene diisocyanate is realized by (1) first reacting a polyester with a molar excess of p-phenylene diisocyanate to provide an isocyanate-terminated polyesterurethane, which is then (2) further reacted with additional amounts of polyester used to make the polyesterurethane. The first stage polymer (1) as prepared, is liquid and stable at temperatures of reaction with additional polyester, so that a continuous commercial process is possible without the stability problems faced when reacting all of the polyester and p-phenylene diisocyanate together to form the desired polyesterurethane.

DETAILED DESCRIPTION

The polyesters are readily prepared from aliphatic glycols containing 2 to 8 carbon atoms, including for example, ethanediol, butanediol-1,4, -hexanediol-1,6, and the like, reacted with aliphatic dicarboxylic acids containing 4 to 10 carbon atoms including, for example, adipic, pimelic, suberic and sebacic acids, or mixtures thereof. Particularly useful hydroxyl terminated polyesters are obtained by reacting a molar excess of a glycol containing 4 to 6 carbon atoms with an acid containing 6 to 8 carbon atoms. Butanediol-1,4 and adipic acid reacted together form a useful hydroxyl terminated polyester. The polyesters have molecular weights over a range normally about 800 to about 1500, and more usually about 850 to about 1200.

In the preparation of the desired polyurethane, in accordance with this invention, the hydroxyl-terminated polyester is first reacted with p-phenylene diisocyanate in a ratio greater than 2 to less than 4 mols of p-phenylene diisocyanate per mol of hydroxyl-terminated polyester, i.e., about 2.5:1 to 3.5:1, more preferably about 2.75 to 1 to 3.25 to 1. When lower ratios of diisocyanate to polyols are used, the resulting polyurethane is too viscous to handle in the second stage of this invention, and when more than about 4 mols of diisocyanate per mole of hydroxyl-terminated polyester are used, a problem of heat stability appears that is quite serious.

This first stage polymer is readily prepared by melting the hydroxyl-terminated polyester to a temperature greater than about 90° C. to about 130° C., but more preferably at a temperature of about 100° C. to 120° C. and adding the solid p-phenylene diisocyanate to the molten hydroxyl-terminated polyester and the two allowed to react to form the desired isocyanate terminated polyurethane. Normally the reaction will be complete in about 30 to 60 minutes at the 100° to 120° C. temperature. This first stage polyesterurethane melts at a temperature of greater than about 50° C. but it is necessary only that it be molten at 90° C.

In the second stage, the isocyanate terminated polyesterurethane is reacted with additional hydroxyl-terminated polyester in amounts so that substantially all of the free isocyanate groups are reacted to form the desired uniform final product. The total molar ratio of isocyanate groups to hydroxyl groups in the final product may range from 0.98 to 1.06, but more preferably is about 1.0 to 1.04. When the first stage isocyanate terminated polyesterurethane is made from 3 mols of diisocyanate and 1 mol of hydroxyl-terminated polyester, 2 mols of additional hydroxyl-terminated polyester are reacted in a continuous reaction with this material to form the desired uniform final product. If the ratio of diisocyanate to hydroxyl-terminated polyester is 2.5 to 1 then about 1.5 mols of hydroxyl-terminated polyester will be used.

Normally the hydroxyl-terminated polyester used will be the same hydroxyl-terminated polyester and the same molecular weight as that used to make the first stage isocyanate terminated polyesterurethane. However, it is contemplated that hydroxyl-terminated polyesters of different molecular weights within the ranges set forth above may be used in the first and second stages, as well as different hydroxyl-terminated polyesters, as defined above, may be used in the first and second stages. In any event, the hydroxyl-terminated polyester will have molecular weights in the range of about 850 to 1200 and are made from the glycols and acids defined hereinabove, and the ratios of diisocyanate to hydroxyl-terminated polyester set forth above are observed.

In a continuous operation, which is desirable for the second stage reaction, the first stage isocyanate terminated polyesterurethane is maintained at a temperature of about 90° to 100° C. and the hydroxyl-terminated polyester at a temperature of about 50° C. or higher so long as it is molten, and streams of the two are metered at a molar ratio substantially equivalent to a stoichiometric balance of the isocyanate and hydroxyl groups into a reaction vessel for a sufficient period of time to form the polyurethane, such as 3 to 5 minutes, and the reaction product removed from the reaction vessel as a melt, cooled and granulated.

In a specific embodiment, an isocyanate terminated polyesterurethane is prepared continuously with no stability problems by reacting p-phenylene diisocyanate with hydroxyl-terminated polytetramethylene adipate having a molecular weight of 1032 and a ratio of 3 mols of diisocyanate to 1 mol of hydroxyl-terminated polyester by adding the p-phenylene diisocyanate to the molten hydroxyl-terminated polyester at about 100° C. The resulting isocyanate terminated polyesterurethane at a temperature of 90° C. and 2 mols of the same hydroxyl-terminated polyester at about 55° C., are metered to a reaction vessel in essentially stoichiometric amounts and mixed about 3 minutes, then heated to 140° C. to complete the reaction. The resulting product was taken from the reaction vessel as a melt, cooled and granulated and after being formed into test specimens, the following physical properties were determined.

TABLE I

| | |
|---|---|
| Tensile Strength (psi) | 5500 |
| Elongation (%) | 660 |
| 300% Modulus (psi) | 1700 |
| Hardness (Shore D) | 44 |
| Vicat-Method B (°C.) | 76 |
| Tear Strength | |
| Die C (pli) | 630 |
| Tg (°C.) | −39 |
| T melt (°C.) | 87 to 126 |
| T crystallization (°C.) | 71 |

In contrast, to demonstrate the problems in trying to handle molten p-phenylene diisocyanate in a continuous polymerization, p-phenylene diisocyanate melted at 100° C. and circulated through a metering system could not be controlled accurately and nonuniform polyesterurethane was obtained. Further, after about 8 hours, the system plugged so severely that all the p-phenylene diisocyanate feed lines had to be replaced.

The uniform polyesterurethanes produced in accordance with this invention find many uses in molding and other applications. They are particularly useful in the compression molding of golf ball covers as is described in U.S. Pat. No. 4,248,432.

I claim:

1. An improved method for preparing polyesterurethanes by first reacting together greater than 2 and less than 4 mols of p-phenylene diisocyanate with 1 mol of a hydroxyl-terminated polyester, derived from aliphatic glycols containing 2 to 8 carbon atoms and aliphatic dicarboxylic acids containing 4 to 10 carbon atoms and having a molecular weight from about 800 to about 1500, in a molten state at a temperature to react with the p-phenylene diisocyanate to form an isocyanate terminated polyesterurethane and then continuously mixing molten hydroxyl-terminated polyesters having a molecular weight of about 800 to 1500 derived from aliphatic glycols containing 2 to 8 carbon atoms and aliphatic dicarboxylic acids containing 4 to 10 carbon atoms when said isocyanate terminated polyesterurethane in a molten state at a temperature to form a polyesterurethane in a molar ratio so that substantially all of the isocyanate and hydroxyl groups are reacted together and the resulting polyesterurethane contains less than 0.05 mol of free isocyanate groups.

2. A method of claim 1 wherein said glycol contains 2 to 4 carbon atoms, said dicarboxylic acid is adipic acid and molecular weight of said hydroxyl-terminated polyesters is about 850 to 1200, the reaction temperature of the first reaction is greater than about 90° C. to about 130° C. and the molar ratio of diisocyanate to hydroxyl-terminated polyester in the first reaction is about 2.5 to 1 to 3.5 to 1, the amount of hydroxyl-terminated polyester used in the second reaction is about 1.5 to 2.5 at an initial reaction temperature of about 100° to 120° C.

3. A method of claim 2 wherein said hydroxyl-terminated polyester is hydroxyl polytetramethylene adipate and the total molar ratio of isocyanate to polyester used is from about 1.0 to 1.04.

4. A method of claim 3 wherein said hydroxyl-terminated polyester has a molecular weight of about 1000, the molar ratio of diisocyanate to hydroxyl-terminated polyester to form the isocyanate terminated polyesterurethane is about 3 to 1 and there is reacted with said isocyanate terminated polyesterurethane about 2 mols hyroxyl polytetramethylene adipate having a molecular weight of about 1000.

5. A polyesterurethane prepared by first reacting together greater than 2 and less than 4 mols of p-phenylene diisocyanate with 1 mol of a hydroxyl-terminated polyester derived from aliphatic glycols containing 2 to 8 carbon atoms and aliphatic dicarboxylic acids containing 4 to 10 carbon atoms and having a molecular weight from about 800 to about 1500, whereby an isocyanate terminated polyesterurethane is formed and then in a second reaction continuously reacting hydroxyl-terminated polyesters having molecular weights of about 800 to 1500 derived from aliphatic glycols containing 2 to 8 carbon atoms and aliphatic dicarboxylic acids containing 4 to 10 carbon atoms with said isocyanate terminated polyesterurethane in a molar ratio so that substantially all of the isocyanate and hydroxyl groups are reacted together and the resulting polyesterurethane contains less than 0.05 mol of free isocyanate groups.

6. A polyesterurethane of claim 5 wherein said glycol contains 2 to 4 carbon atoms, said dicarboxylic acid is adipic acid, the molecular weight of said hydroxyl-terminated polyester is about 850 to 1200, the molar ratio of diisocyanate to hydroxyl-terminated polyester in the first reaction is about 2.5 to 1 to 3.5 to 1 and said polyesterurethane contains less than 0.2 mol of free isocyanate groups.

7. A polyesterurethane of claim 6 wherein said hydroxyl-terminated polyester is hydroxyl polytetramethylene adipate and the total molecular ratio of isocyanate to hydroxyl groups used is from about 1.0 to 1.04.

8. A polyesterurethane of claim 7 wherein said hydroxyl-terminated polyester has a molecular weight of about 1000, the molar ratio of diisocyanate to hydroxyl-terminated polyester to form the isocyanate terminated polyesterurethane is about 3 to 1 and there is reacted with said isocyanate terminated polyesterurethane about 2 mols of hydroxyl polytetramethylene adipate having a molecular weight of about 1000.

* * * * *